March 22, 1938. W. T. MEHAFFEY 2,111,637
BOTTLE CAP AND TIME INDICATING MEANS FOR MEDICINAL RECEPTACLES
Filed Dec. 10, 1935 2 Sheets-Sheet 1
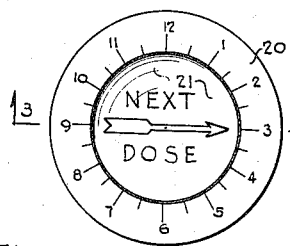
FIG.1
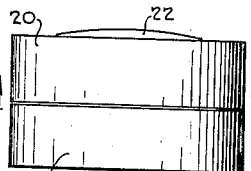
FIG.2
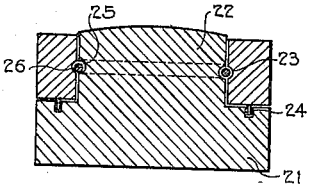
FIG.3
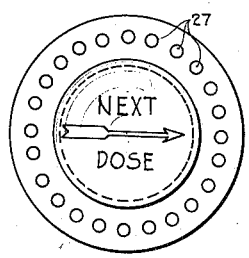
FIG.4
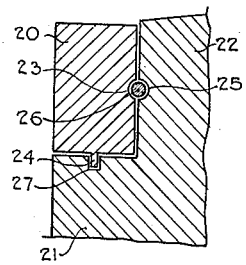
FIG.6
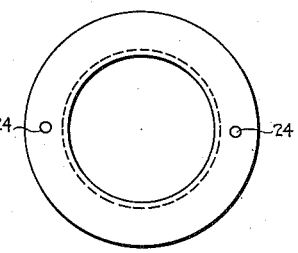
FIG.5
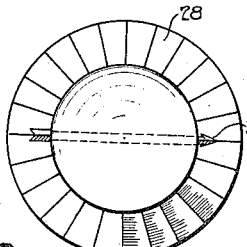
FIG.8
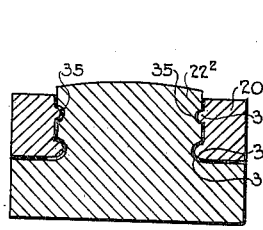
FIG.10
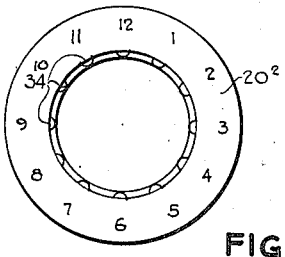
FIG.11
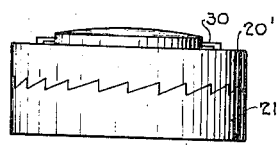
FIG.7
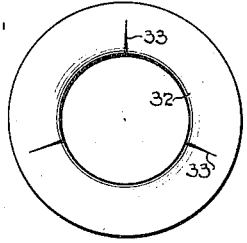
FIG.12
FIG.9
INVENTOR.
WILLIAM T. MEHAFFEY
BY Peter M. Boesen
ATTORNEY.

March 22, 1938.   W. T. MEHAFFEY   2,111,637
BOTTLE CAP AND TIME INDICATING MEANS FOR MEDICINAL RECEPTACLES
Filed Dec. 10, 1935   2 Sheets-Sheet 2

INVENTOR.
WILLIAM T MEHAFFEY.
BY *Peter W. Boesen*
ATTORNEY.

Patented Mar. 22, 1938

2,111,637

UNITED STATES PATENT OFFICE 2,111,637

BOTTLE CAP AND TIME INDICATING MEANS FOR MEDICINAL RECEPTACLES

William T. Mehaffey, Brooklyn, N. Y.

Application December 10, 1935, Serial No. 53,721

4 Claims. (Cl. 116—121)

This invention relates to new and useful improvements in bottle caps, especially of the kind used for medicine bottles, and the said caps have with this object in view been constructed with a recording dial and dose indicator.

As the construction of my device is comparatively simple, the cost of manufacturing the same should be proportionately low.

With the above and other objects in view, this invention consists of the novel features of construction, combination and arrangement of parts hereinafter fully described, claimed and illustrated in the accompanying drawings forming part of this application, and in which similar characters of reference indicate corresponding parts in all views, and in which:—

Figure 1 is a top elevational view of my invention.

Figure 2 is a side elevational view of same; while

Figure 3 is a transverse sectional view, taken on the line 3—3 in Figure 1.

Figure 4 is a top elevational view of the bottom part of the device; while

Figure 5 is an elevational view of the bottom of the top part of same; and

Figure 6 is an enlarged detail transverse sectional view of the side portions of the top and bottom member, showing especially the means for locking these two members together.

Figure 13:
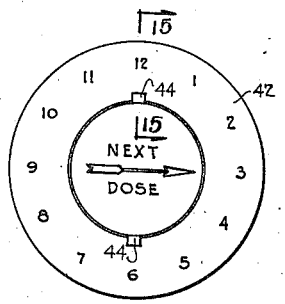
Figure 14:
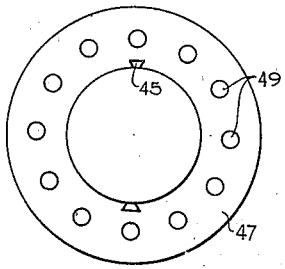
Figure 15:
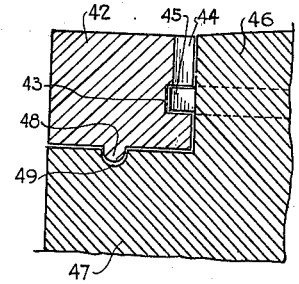
Figure 16:
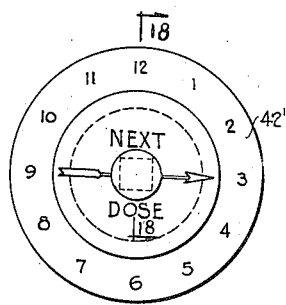
Figure 17:
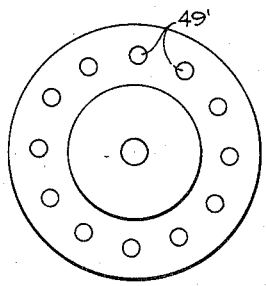
Figure 18:
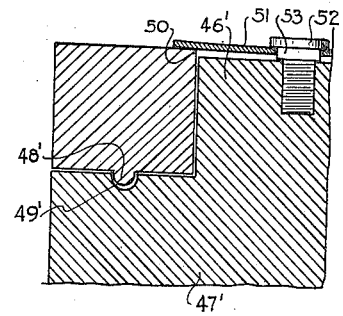
Figure 19:
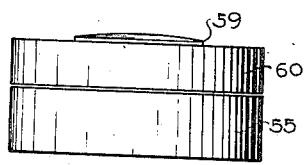
Figure 20:
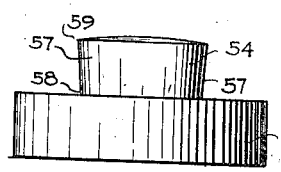
Figure 21:
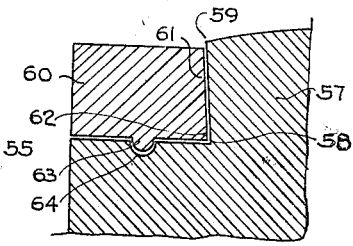

Figure 7 shows a side elevational view of a modification of my device, wherein the apertures and pins, especially shown in the Figures 4 and 5, are replaced with a kind of sawtoothed arrangement. Figure 8 illustrates the top surface of the top part, shown in Figure 7; while Figure 9 shows the top surface of the corresponding bottom part. Figure 10 is a transverse sectional view of another modification of my device. Figure 11 is a top elevational view of the upper part of said modified construction; and Figure 12 is a bottom view of said upper part; Figure 13 is a top elevational view of another slight modification; while Figure 14 is a similar view of the lower part of the two units comprising this modification; and Figure 15 a transverse sectional view, taken on the line 15—15 of Figure 13. Figure 16 is a top elevational view of a still further modification; while Figure 17 is a similar view of the lower part of the device; and Figure 18 is a transverse sectional view, taken on the line 18—18 in Figure 16. Figures 19, 20 and 21 show an additional modification.

Referring more particularly to the drawings, 20 indicates the upper portion of a bottle cap member, which is shown as a unit in Figure 2. Said upper portion is upon its rim formed with time indicating numerals, from 1 to 12. The said upper portion is mounted upon a second portion 21, which terminates in a neck portion 22, the latter having upon its top surface indicating means, for instance in the form of an arrow, as shown in Figure 1, adapted to cooperate with the numerals upon the rim of the portion 20. The said portion 20 is formed with an annular recess 23 upon its inner cylindrical surface, and with two downwardly projecting small studs 24, upon its lower surface. The portion 21 has formed upon its neck portion 22 an annular recess 25, an elastic band, or spring 26 is mounted in said recess 25 and adapted to extend into the recess 23 of the upper portion 20, when the latter is pressed down over the neck of the portion 21, the said band or spring member thus supplying, by overlapping and by friction, means whereby said upper and lower portions 20 and 21 are being held together, although at the same time permitting said two portions to be turned with respect to one another for the sake of adjusting the time indicating means.

In order, however, to accomplish said adjustment in a perfect manner, the studs 24 are made to engage shallow apertures 27, shown in Figure 4, and formed in the peripheral surface surrounding the neck 22 of the portion 21.

In Figure 7 is shown a modification of my device to the effect that the upper and lower portions 20' and 21' have their surfaces 28 and 29, respectively, joined by means of a corrugated, or sawtoothed arrangement, of a shallow depth, as shown in the Figures 7, 8 and 9; a pin 30, which also serves as an indicator relative to the numerals upon the rim portion, is inserted through the neck portion of the member 21', thus securing the two portions 20' and 21' together.

Another modification has been shown in Figure 10, where the neck portion 22² has been formed at the bottom thereof with an annular recess 31 adapted to receive therein the flange 32, which in this modification is formed upon the upper portion 20², as slits 33, shown in Figure 12, are made in said flange in order to conveniently secure and adjust the latter to the recess 31. The side of the neck portion 22² is formed with a somewhat corrugated, or studded surface 35 adapted to cooperate and register with a corrugated surface 34 formed upon the inner side of the cylindrical opening in the portion 20².

A still further modification is shown in Figure 13. In this view the relative attachment of the portion 20² to the portion 21² is maintained, as shown before in regard to the flange arrangement illustrated in Figure 10.

The portion 21² is, however, in this latter modification formed with a somewhat semispherical depression 36 therein, and said depression further having at the center thereof a small cylindrical recess 37.

A substantially ball-shaped member 38 formed with an indicator 39 at its top and adapted to cooperate with the numerals upon the upper surface of the portion 20², is adapted to turn in said semispherical depression, as said ball-shaped member upon its lower surface is formed with a stud 40 made to engage the recess 37.

The ball is secured in position by the member 20², as the latter has at its center an opening 41 curved to fit said ball-shaped member and engage the latter above the horizontal center line thereof.

In the modification shown in the Figures 14, 15 and 16, 42 indicates a cap member, which is formed with an opening in its top, and with an annular recess 43 in the wall of said opening, as may be seen in Figure 16; the said cap member is further made with two small recesses therein, as shown at 44, adapted to pass over correspondingly placed studs 45 formed upon the neck portion 46 of the lower part 47 of the device; said studs 45 are of a somewhat triangular form and of a size so much larger than the recesses 44 that the cap member 42 actually has to be pressed or forced down over the neck portion 46 for the sake of assembly; once, however, the cap member 42 is mounted in position, it will be comparatively secure against removal, while the studs 45 will travel freely in the recess 43 during rotation of said cap member for the purpose hereinbefore stated.

The said cap member 42 is further formed with a small downwardly projecting stud 48 adapted to engage a plurality of orifices 49 peripherally arranged in the top surface of the lower part 47 and corresponding to the time indications on top of the cap member.

In the modifications shown in the Figures 17, 18 and 19, 42' indicates a cap member turnably mounted upon the neck portion 46' of the lower part of the device 47', as said cap member projects slightly above the neck portion 46', as shown at 50; the cap member is formed with a stud 48' adapted to engage and register with the orifices 49', while said cap member is rotatably held in position by means of a flexible disk member 51, which in turn is secured to the neck portion 46' by means of a screwbolt 52; the said disk being formed with a square opening therein adapted to fit a correspondingly formed portion 53 on the screwbolt in order to retain said disk in a stationary position.

A still further modification is shown in the Figures 20, 21 and 22.

This modification is based on the principles of materials contracting with the change of temperature.

Bakelite, which co-efficient of expansion is .006, is used in this latter modified construction. The neck portion 57 of the base 55 is shown with inwardly tapered sides. The slope of the latter is determined on the principle that the circumference of the lower point 58 of said neck portion at a certain temperature will equal the circumference at the high point 59 when cold. The ring or upper cap member 60 is provided with a correspondingly tapered inner surface 61, and has the usual time indications on its top surface, as hereinbefore described.

The assembly of said parts takes place in the following manner:

With the base and its neck portion cooled off, the ring 60 is taken from the mold and while hot is forced over the top of the cold neck portion, and naturally when cooling off the ring will contract, thus forming a complete assembly, although permitting said ring member to be freely turned on the neck portion.

The relation between the height of the neck portion and that of the ring member is to the effect that the neck portion will, when the ring is mounted upon the latter, project slightly above said ring member, thereby securing the latter against removal.

The base is upon its peripheral surface provided with orifices 64 adapted to receive therein a stud 63 formed upon the lower surface of the ring member; said latter arrangement being similar to those hereinbefore described.

It is obvious that changes may be made in the form, construction and arrangement of the several parts, as shown and described, within the scope of the appended claims without departing from the spirit of the invention, and I do not therefore wish to limit myself to the exact construction and arrangement shown and described herein.

What I claim as new, and desire to secure by Letters Patent of the United States, is:—

1. A medicinal bottle cap and dose indicator, comprising a lower member, and an annular upper member provided with time-index means upon its top surface, a neck portion upon said lower member, the latter being formed with a number of orifices in its upper peripheral surface, the annular upper member being turnably mounted upon said neck portion and protruding slightly above the latter, a flexible disk member fixedly secured on top of the neck portion and adapted to retain the annular member in turnable position, and a stud formed upon the annular member and adapted to alternately engage said orifices.

2. A device, as claimed in claim 1, and wherein a screw-bolt formed with a partly square body portion engages said disk, substantially as and for the purpose set forth.

3. A medicinal bottle cap and dose indicator, comprising an upper annular member provided with time-index means upon its top surface, a lower member formed with a neck portion and adapted to have said upper member mounted upon the latter, means upon said upper member adapted to engage said neck portion and permit rotation of said upper member upon the latter, the lower member being formed with orifices in its peripheral surface co-acting with the time-index means upon the upper surface of the annular member, and a stud formed upon the latter and adapted to alternately engage said orifices.

4. In a device of the class described, a base formed with a substantially cylindrical neck portion, said neck portion being of a larger diameter at its top than at the bottom, and an annular member turnably mounted upon said neck portion, the neck portion projecting above said annular member securing it in position, the base being at its upper peripheral surface formed with orifices therein, and a stud arranged underneath said annular member and adapted to engage said orifices, substantially as and for the purpose set forth.

WILLIAM T. MEHAFFEY.